US012679391B2

(12) United States Patent
Miyao et al.

(10) Patent No.: US 12,679,391 B2
(45) Date of Patent: Jul. 14, 2026

(54) VEHICLE ELECTRONIC CONTROL DEVICE AND METHOD THEREOF

(71) Applicant: DENSO CORPORATION, Kariya-city (JP)

(72) Inventors: Masanori Miyao, Kariya-city (JP); Mami Shiomi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 100 days.

(21) Appl. No.: 18/745,291

(22) Filed: Jun. 17, 2024

(65) Prior Publication Data

US 2025/0074435 A1      Mar. 6, 2025

(30) Foreign Application Priority Data

Aug. 30, 2023    (JP) ................................ 2023-140471

(51) Int. Cl.
| | |
|---|---|
| *G06F 11/00* | (2006.01) |
| *B60W 50/02* | (2012.01) |
| *B60W 50/029* | (2012.01) |
| *G06F 11/07* | (2006.01) |
| *G06F 11/18* | (2006.01) |

(52) U.S. Cl.
CPC ...... *B60W 50/0205* (2013.01); *B60W 50/029* (2013.01); *G06F 11/0796* (2013.01); *G06F 11/18* (2013.01); *B60W 2050/021* (2013.01); *B60W 2050/0295* (2013.01)

(58) Field of Classification Search
CPC ...... G06F 11/18; G06F 11/181; G06F 11/182;

G06F 11/186; G06F 11/0796; G06F 11/183; G06F 11/3668; G06F 11/3688; B60W 50/0205; B60W 50/029; B60W 50/035;

(Continued)

(56) References Cited

U.S. PATENT DOCUMENTS 5,458,404 A * 10/1995 Fennel .................... B60T 8/885
                                                                303/122
5,895,434 A * 4/1999 Fennel .................. B60T 8/1755
                                                                701/36

(Continued)

FOREIGN PATENT DOCUMENTS

JP          H06-305376 A       11/1994

OTHER PUBLICATIONS

U.S. Appl. No. 18/745,205, filed Jun. 17, 2024, Miyao et al.

*Primary Examiner* — Marc Duncan
(74) *Attorney, Agent, or Firm* — Posz Law Group, PLC

(57) ABSTRACT

A vehicle electronic control device, which is mounted on a vehicle and executes a predetermined function of the vehicle, includes: a main processor; a sub processor; and an abnormality determination unit comparing a calculation result of the main processor with a calculation result of the sub processor and determining an abnormality in the main processor based on a comparison result. The predetermined function is performed by a main process executed by the main processor according to a main program. A sub program executed by the sub processor is capable of executing the predetermined function equivalent to the predetermined function of the main program. The sub program provides an improved performance than the main program by having a configuration that differs in part or in whole from a configuration of the main program.

12 Claims, 9 Drawing Sheets

(58) Field of Classification Search
    CPC ... B60W 2050/021; B60W 2050/0295; B60W
                                            2050/0297
    See application file for complete search history.

(56)                    References Cited

U.S. PATENT DOCUMENTS

| | | | |
|---|---|---|---|
| 6,823,251 B1 * | 11/2004 | Giers | B60W 50/0205 |
| | | | 700/20 |
| 2014/0108896 A1 * | 4/2014 | Jung | G06F 11/0796 |
| | | | 714/819 |
| 2019/0300009 A1 | 10/2019 | Sakamoto et al. | |
| 2022/0048525 A1 * | 2/2022 | Tsai | G06F 11/22 |
| 2023/0062116 A1 * | 3/2023 | Ma | B60W 50/023 |
| 2023/0222050 A1 * | 7/2023 | Ishigooka | G06F 11/3692 |
| | | | 717/124 |
| 2025/0077218 A1 * | 3/2025 | Miyao | G06F 8/65 |

* cited by examiner

FIG. 6

| CASE | MAIN PROCESS | | SUB PROCESS | | EXECUTION |
|------|--------|-------|--------|-------|-----------|
|      | CAMERA | RADAR | CAMERA | RADAR |           |
| 1  | ○ | ○ | ○ | ○ | SHADOW MODE OR BACKUP MODE |
| 2  | ○ | ○ | ○ | × | SHADOW MODE |
| 3  | ○ | ○ | × | ○ | SHADOW MODE |
| 4  | ○ | ○ | × | × | SHADOW MODE |
| 5  | ○ | × | ○ | ○ | BACKUP MODE |
| 6  | ○ | × | ○ | × | SHADOW MODE OR BACKUP MODE |
| 7  | ○ | × | × | ○ | SHADOW MODE OR BACKUP MODE |
| 8  | ○ | × | × | × | SHADOW MODE |
| 9  | × | ○ | ○ | ○ | BACKUP MODE |
| 10 | × | ○ | ○ | × | SHADOW MODE OR BACKUP MODE |
| 11 | × | ○ | × | ○ | SHADOW MODE OR BACKUP MODE |
| 12 | × | ○ | × | × | SHADOW MODE |
| 13 | × | × | ○ | ○ | BACKUP MODE |
| 14 | × | × | ○ | × | BACKUP MODE |
| 15 | × | × | × | ○ | BACKUP MODE |
| 16 | × | × | × | × | SHADOW MODE |

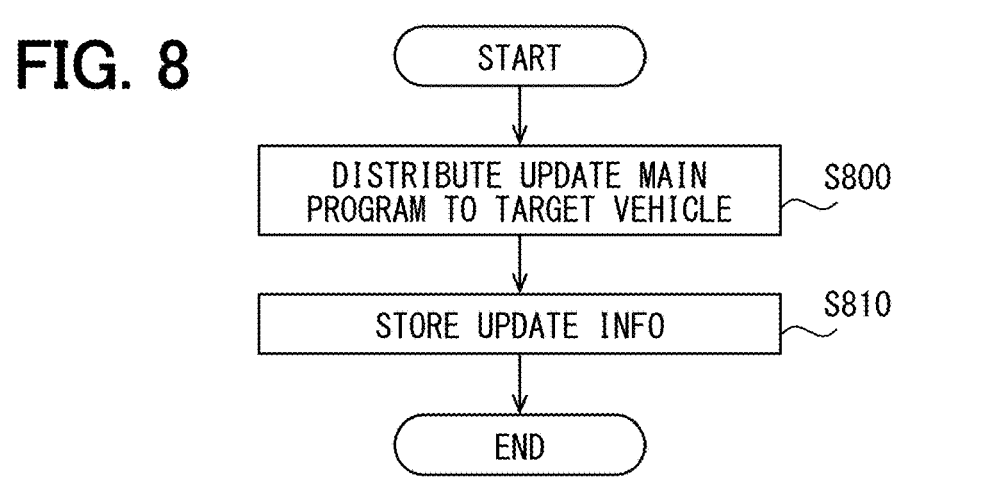

FIG. 7

START

DISTRIBUTE DIFFERENT VERSION OF SUB PROGRAM TO TARGET VEHICLE — S700

INQUIRE TARGET VEHICLE ABOUT EVALUATION DATA OF SUB PROGRAM — S710

S720 DETERMINE NECESSITY OF EVALUATION DATA

UNNECESSARY

NECESSARY

INSTRUCT TRANSMISSION OF EVALUATION DATA — S730

INSTRUCT DISCARD OF EVALUATION DATA — S750

RECEIVE AND STORE EVALUATION DATA — S740

S760 REQUIRED AMOUNT OF EVALUATION DATA COLLECTED?

NO

YES

END

FIG. 8

START

DISTRIBUTE UPDATE MAIN PROGRAM TO TARGET VEHICLE — S800

STORE UPDATE INFO — S810

END

VEHICLE ELECTRONIC CONTROL DEVICE AND METHOD THEREOF

CROSS REFERENCE TO RELATED APPLICATION

The present application claims the benefit of priority from Japanese Patent Application No. 2023-140471 filed on Aug. 30, 2023. The entire disclosure of the above application is incorporated herein by reference.

TECHNICAL FIELD

The present disclosure relates to a vehicle electronic control device, which is mounted on a vehicle and executes a predetermined function of the vehicle. The present disclosure also relates to a method of determining an abnormality in a main process corresponding to a main program executed by the vehicle electronic control device.

BACKGROUND

There has been known a vehicle control device in which one microcomputer performs a calculation same as a calculation performed in another microcomputer.

SUMMARY

A vehicle electronic control device, which is mounted on a vehicle and executes a predetermined function of the vehicle, includes: a main processor; a sub processor; and an abnormality determination unit comparing a calculation result of the main processor with a calculation result of the sub processor and determining an abnormality in the main processor based on a comparison result. The predetermined function is performed by a main process executed by the main processor according to a main program. A sub program executed by the sub processor is capable of executing the predetermined function equivalent to the predetermined function of the main program. The sub program provides an improved performance than the main program by having a configuration that differs in part or in whole from a configuration of the main program.

BRIEF DESCRIPTION OF DRAWINGS

Additional objects and advantages of the present disclosure will be more readily apparent from the following detailed description when taking together with the accompanying drawings. In the drawings:

FIG. 6 is a table for explaining abnormality determination in the main process executed by the main SoC;

FIG. 7 is a flowchart illustrating a process executed by a data center;

FIG. 8 is a flowchart illustrating another process executed by the data center;

DETAILED DESCRIPTION

Figure 1:
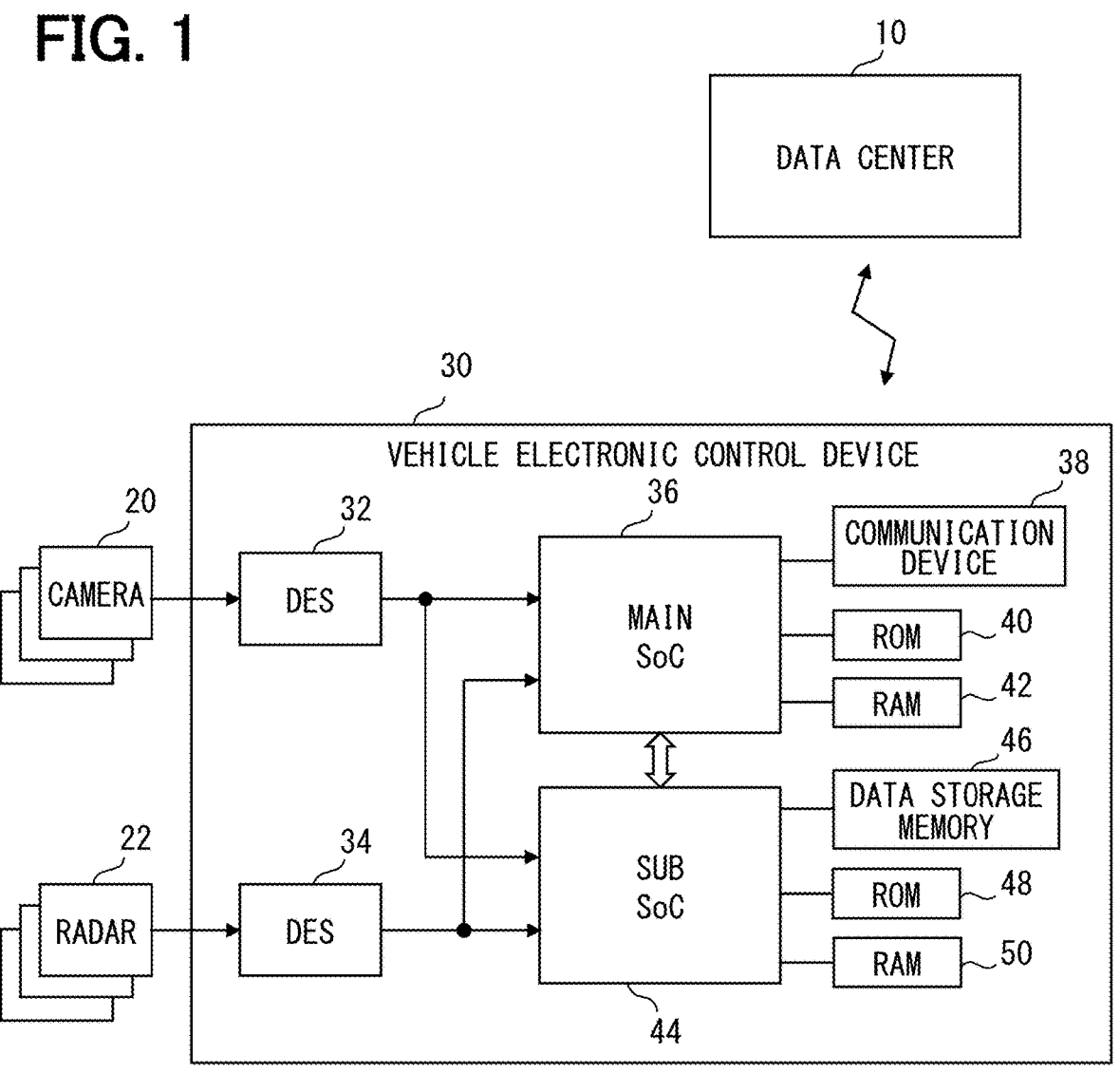
FIG. 1 is a diagram showing an example of a configuration of vehicle electronic control device according to an embodiment of the present disclosure.

In a known vehicle control device according to a related art, one microcomputer performs a calculation same as a calculation performed in another microcomputer. In response to detecting an abnormality in another microcomputer by comparing the calculation result of one computer with the calculation result of another computer, one microcomputer takes over an automatic driving control performed by another microcomputer.

The performance of predetermined function of vehicle, such as automatic driving control function, is improved year by year, and the predetermined function is often installed in new vehicles and model-changed vehicles. Furthermore, in recent years, technology such as over the air (OTA) has become widespread. The OTA technology allows programs to be rewritten via wireless communication after the product is released onto the market.

In order to verify the performance improvement of predetermined function, it is desirable to actually evaluate different versions of control program with improved performance in various scenes that the vehicle encounters.

The present disclosure is made in consideration of the above-described difficulties.

According to an aspect of the present disclosure provides a vehicle electronic control device is mounted on a vehicle and executes a predetermined function of the vehicle. The vehicle electronic control device includes: a main processor executing a main process according to a main program based on input data from at least one sensor; a sub processor executing a sub process according to a sub program based on input data same as the input data of the main processor; and an abnormality determination unit comparing (i) a calculation result of the main process calculated by the main processor with (ii) a calculation result of the sub process calculated by the sub processor. The abnormality determination unit determines an abnormality in the main processor based on a comparison result of the calculation results. The predetermined function is performed by the main process, which is executed by the main processor according to the main program. The sub program is capable of executing the predetermined function equivalent to the predetermined function of the main program. The sub program provides an improved performance than the main program by having a configuration that differs in part or in whole from a configuration of the main program.

According to another aspect of the present disclosure, a method determines an abnormality in a main process executed according to a main program. The method is executed by at least one processor of a vehicle electronic control device mounted on a vehicle. The vehicle electronic control device executes a predetermined function of the vehicle. The method includes: executing a main process according to a main program based on input data from at least one sensor; executing a sub process according to a sub program based on input data same as the input data of the main process; and comparing a calculation result of the main process with a calculation result of the sub process and determining an abnormality in the main process based on a comparison result of the calculation results. The predetermined function is executed by the main process according to the main program. The sub program is capable of executing the predetermined function equivalent to the predetermined function of the main program. The sub program provides an improved performance than the main program by having a configuration that differs in part or in whole from a configuration of the main program.

According to the vehicle electronic control device and method in the present disclosure, a sub program is installed to the vehicle electronic control device mounted on the vehicle. The sub program is capable of executing a function same as a function of the main program, and has a configuration that differs in part or in whole from that of the main program in order to improve performance. The calculation result of sub process according to the sub program is compared with the calculation result of main process according to the main program. Based on the comparison result, an abnormality in the main process is determined. According to the vehicle electronic control device and method of the present disclosure, it is possible to detect an abnormality in the main process, which actually performs control by executing the main program, by using the sub program.

The following will describe embodiments of the present disclosure with reference to the drawings. Note that the same or similar components are denoted by the same reference symbol throughout multiple drawings, and description thereof may be omitted. When only a part of a configuration is described in each embodiment, a configuration of another embodiment described earlier can be applied to the other part of the configuration. In addition to the combination of the configurations explicitly described in the description of each embodiment, the configurations of multiple embodiments may be partially combined even if not explicitly described as long as there is no difficulty in the combination.

First Embodiment

FIG. 1 is a diagram showing a configuration example of a vehicle electronic control device 30 according to the present embodiment. A vehicle in which the vehicle electronic control device 30 is installed is not limited to a general private passenger car, and may include a rental vehicle, a manned taxi, a ride-sharing vehicle, a freight vehicle, a bus, etc. The vehicle in which the vehicle electronic control device 30 is installed may be a right-hand drive vehicle or a left-hand drive vehicle. A traffic environment of the vehicle may be a left-hand traffic environment or a right-hand traffic environment.

As shown in FIG. 1, the vehicle electronic control device 30 includes two systems on chips (SoCs), that is, a main SoC 36 and a sub SoC 44, which function as main processor and sub processor that perform various types of arithmetic processing according to corresponding programs. The processor is not limited to a SoC, and may be a central processing unit (CPU), a graphics processing unit (GPU), a neural network processing unit (NPU), or the like. The processor may be configured using a field-programmable gate array (FPGA) or an application specific integrated circuit (ASIC).

FIG. 1 shows an example in which two SoCs are provided as processors. The number of processors may be one, or three or more. When the number of processors is one, the main process executed by the main SoC 36 and the sub process executed by the sub SoC 44 can be configured in multitask manner, for example, by time sharing.

The programs may be stored in rewritable read only memories (ROMs) 40, 48 connected to the main SoC 36 and the sub SoC 44, respectively. A configuration of storage medium (non-transitory tangible storage medium) that stores the program may be changed as appropriate, such as an optical disk, a hard disk drive, or a solid-state drive. The storage medium is not limited to a configuration that is mounted on a circuit board. The storage medium may be provided by a memory card that is inserted into a slot, and the memory card may be electrically connected to each of the main SoC 36 and the sub SoC 44.

The vehicle electronic control device 30 is connected to an in-vehicle network (not shown) installed in the vehicle, and is capable of outputting control commands to various devices, machines, actuators of the vehicle via the in-vehicle network. The various devices, machines, and actuators connected to the in-vehicle network are capable of communicating with one another via the in-vehicle network. Various sensors may be connected to the in-vehicle network.

The vehicle electronic control device 30 has, as sensors, at least one camera 20 and/or at least one radar sensor 22. The vehicle electronic control device 30 is capable of acquiring information about periphery environment of the vehicle using these sensors. The camera 20 may be attached to a front portion of the vehicle, and is configured to capture an image of forward area of the vehicle and output the captured image as serial data. The camera 20 may be attached to the vehicle so as to output, in addition to the forward image, an image indicating a lateral area of the vehicle, an image indicating a rear area of the vehicle, and the like. The periphery images, such as the forward image, the lateral image, and/or the rear image are output from the camera 20, and then input to the vehicle electronic control device 30.

The radar sensor 22 may be a millimeter wave sensor attached to the front portion of the vehicle. The radar sensor 22 includes a transmitter, which transmits millimeter waves toward a forward range or forward lateral range of the vehicle, a receiver, which receives millimeter waves reflected by an object, and a detector, which detects the object (a stationary object or a moving object) based on the transmitted and received millimeter waves. The receiver has multiple millimeter wave receiving antennas. The detector detects a distance from the vehicle to the object based on the transmission and reception time of millimeter waves. The detector detects a direction of the object relative to the vehicle from a phase difference of millimeter waves received by the multiple receiving antennas. The radar sensor 22 generates detection information (periphery information) of the object existing around the vehicle, and the detection information includes the distance to the object (or the transmission and reception time of millimeter waves) and the direction of object. Then, the radar sensor 22 outputs the generated periphery information as serial data. The radar sensor 22 may be disposed at multiple locations on the vehicle so as to detect objects existing around the vehicle, such as the lateral range, rear lateral range, and/or rear range in addition to the forward range and front lateral range of the vehicle. The periphery information output by the radar sensor 22 is input to the vehicle electronic control device 30.

The periphery image output from the camera 20 and the periphery information output from the radar sensor 22 are input to the vehicle electronic control device 30, and then deserializers (DES) 32 and 34 included in the vehicle electronic control device 30 perform serial-parallel conversions to the input data. The periphery image data converted by the deserializer 32 and the periphery information data converted by the deserializer 32 are input in parallel to the main SoC 36 and the sub SoC 44. That is, the main SoC 36 and the sub SoC 44 receive the same input data.

In addition to or instead of the above-described camera 20 and radar sensor 22, sensors such as a surrounding camera, a lidar sensor, and a sonar may be mounted on the vehicle. Instead of the above-described deserializers 32, 34, a communication interface of in-vehicle network, such as Ethernet (registered trademark) or CAN (registered trademark) may be used as a receiving interface for receiving data from each sensor 20, 22. Thus, the detection data from each sensor 20, 22 may be transmitted to the main SoC 36 and the sub SoC 44 via the in-vehicle network.

The vehicle electronic control device 30 may also be configured to receive detection signals from a vehicle state sensor (not shown) for detecting a state of vehicle. The vehicle state sensor for detecting vehicle state may include a global navigation satellite system (GNSS) sensor capable of acquiring position and time information, a vehicle speed sensor for detecting a speed of the vehicle, and a temperature sensor or humidity sensor for determining weather information. The vehicle electronic control device 30 may be equipped with a receiver capable of receiving traffic information from an external traffic management center. The vehicle electronic control device 30 can acquire, based on the received traffic information, traffic environment data relating to the traffic environment around the vehicle, such as whether, occurrence of traffic congestion, or the like. The vehicle electronic control device 30 can also acquire weather information from an external server.

The main SoC 36 of the vehicle electronic control device 30 executes a predetermined function of the vehicle by performing a main process according to a main program stored in the ROM 40, for example, using a temporary memory function of a RAM 42. The ROM 40 is also referred to as a main program storing ROM. In the present embodiment, as the predetermined function, the main SoC 36 executes a collision prevention control function. In the collision prevention control function, the main SoC detects an object (a stationary object or a moving object) existing in front of the vehicle based on input data from at least one sensor, such as the camera 20 or the radar sensor 22, determines a possibility of collision with the detected object, and outputs control commands to various devices, machines and actuators depending on the level of the determined possibility of collision. In the collision prevention control function, the main SoC 36 calculates, for example, a collision prediction time until the host vehicle collides with an object existing ahead of the host vehicle. When the calculated collision prediction time falls below a first time threshold, the main SoC 36 determines that the possibility of collision is increased, and outputs a control command to an output device (not shown) to issue a warning by audio or display. When the calculated collision prediction time falls below a second time threshold that is shorter than the first time threshold, the main SoC 36 determines that the possibility of collision is further increased. In this case, the main SoC outputs a control command to the vehicle's drive device to reduce a drive force, outputs a control command to the vehicle's braking device to apply a braking force, and/or outputs a control command to the vehicle's steering device to avoid the object existing in front of the vehicle.

The sub SoC 44 of the vehicle electronic control device 30 also utilizes a temporary memory function of a RAM 50 to execute a sub process according to a sub program stored in the ROM 48. The sub program is a program that can execute a function equivalent to the function of main program. The sub program differs in part or entirely from the main program in order to improve performance. The sub program has an improved performance compared to the main program, but the improved performance of sub program has not yet been verified. Therefore, by executing the sub process according to the sub program, similar to the main SoC 36, the sub SoC 44 can detect an object (a stationary object or a moving object) existing in front of the vehicle based on input data from at least one sensor, such as the camera 20 or the radar sensor 22, and determine the possibility of collision with the detected object. However, since the performance of sub program has not been verified, the function of sub program is not configured to actually perform the collision prevention control function as described above. For this reason, the sub program is not configured to output control commands to the various devices when the sub program is executed.

In addition to execution of the sub program, the sub SoC 44 also performs a storing process to store data sets in a data storage memory 46 functions as a storage medium for evaluating the performance of sub program. A program for executing the storing process is also stored in the ROM 48. The storing process may be configured as a part of the sub program.

In the storing process executed by the sub SoC 44, the calculation result calculated by the main process according to the main program is compared with the calculation result calculated by the sub process according to the sub program. The calculation result calculated by the main process is also referred to as a first calculation result, and the calculation result calculation by the sub process is also referred to as a second calculation result. When the first and second calculation results satisfy a predetermined deviation condition, a data set indicating a situation when the calculation results deviated from another are generated is stored in a data storage memory 46. The data set further includes at least one of (i) input data or (ii) the two calculation results. In the present embodiment, the sub process according to a sub program performs arithmetic processing to determine the possibility of collision with the detected object. When the calculation result of the sub program deviates from the calculation result of the main program, the sub program stores, in the data storage medium, the data set indicating the situation when the calculation results having deviation therebetween is acquired, and this storing control is also referred to as a shadow mode.

The calculation result of the main process and the calculation result of the sub process may use the same type of relation indicator, which is related to a performance when executing the predetermined function. In the above-described collision prevention control function, the number of objects, the positions of objects, and the collision prediction time to each object calculated in the main process and the sub process can be used as performance related indicators. When the number of objects, the object positions, and the collision prediction time to each object are compared between the main process and the sub process, in response to a deviation in any of the indicators exceeding a predetermined determination criterion, the above-described predetermined deviation condition is determined to be satisfied. For example, regarding the collision prediction time, when the time difference between the collision prediction time calculated by the main process and the collision prediction time calculated by the sub process exceeds a predetermined third time threshold, the deviation is determined to exceed the predetermined determination criterion. Alternatively, regarding the object position, when the difference between the position of an object calculated by the main process and the position of the same object calculated by the sub process exceeds a predetermined distance threshold, the deviation is determined to exceed the predetermined determination criterion. When the difference between the number of detected objects calculated by the main process and the number of detected objects calculated by the sub process is equal to or greater than a predetermined object number threshold, the deviation is determined to exceed the predetermined determination criterion.

The ROM 48 of the sub SoC 44 further stores a backup program that has the same function as the main program executed by the main SoC 36, and the sub SoC executes a backup process (substitute process) by executing the backup program. The backup program is a verified program. When the sub SoC 44 determines a possibility of abnormality occurrence in the main process executed by the main SoC 36 by comparing the performance related indicators of the main process with the performance related indicators of the sub process, the sub SoC 44 switches an execution target program to be executed from the sub program to the backup program, and performs the backup control. The performance related indicator of the main process is also referred to as a first performance related indicator, and the performance related indicator of the sub process is also referred to as a second performance related indicator. The backup program, similar to the main program of the main SoC 36, is a verified program. The backup program may be the same as the main program, or may be different from the main program. In the present embodiment, a state in which an abnormality occurs in the main SoC 36 and the backup program is executed by the sub SoC 44 is referred to as a backup mode.

In the backup control, the sub SoC 44 compares performance related indicators of the backup process according to the switched backup program executed by the sub SoC 44 with the performance related indicators of the main process according to the main program executed by the main SoC 36 to further confirm whether an abnormality is occurred in the main process executed by the main SoC 36. In the confirmation process, when occurrence of abnormality is confirmed in the main process executed by the main SoC 36, the sub SoC 44 determines that the main SoC 36 is definitely abnormal. In this case, the sub SoC 44 continues to execute the backup process according to the switched backup program, and outputs control commands to various devices, instead of the main SoC 36. For example, the control command from the main SoC 36 is usually output as it is. When control commands are output from both of the main SoC 36 and the sub SoC 44, a selection output circuit may be provided to select and output the control command from the sub SoC 44, so that the control command from the sub SoC 44 can be output. Alternatively, when the sub SoC 44 outputs the control command for backup control, the sub SoC may instruct the main SoC 36 to stop outputting the control command. As a result, during backup control, various devices can be controlled by the control commands output from the sub SoC 44.

A data center 10 shown in FIG. 1 collects evaluation data (data set) of sub program stored in the vehicle electronic control device 30 of each vehicle. Once the sub program has been thoroughly verified by the engineers developing the system and program at the data center based on the collected evaluation data, the data center 10 distributes the verified sub program to each vehicle as a new main program. In each vehicle, in response to receiving the new main program, the main program in the ROM 40 of the main SoC 36 is rewritten by the new main program. When a different version of sub program with improved performance based on collected evaluation data or the like is prepared, the data center 10 distributes the sub program to each vehicle. In each vehicle, in response to receiving a different version of sub program, the sub program stored in the ROM 48 of sub SoC 44 is rewritten by the received different version of sub program.

The vehicle electronic control device 30 includes a communication device 38 for communicating with the data center 10. In the example shown in FIG. 1, the communication device 38 is connected to the main SoC 36. For example, when transmitting evaluation data of sub program to the data center 10, the main SoC 36 acquires the evaluation data from the sub SoC 44 and transmits the acquired evaluation data to the data center 10. When the communication device 38 receives a different version of sub program having improved performance, the main SoC 36 transfers the received sub program to the sub SoC 44. The communication device 38 may also be provided with respect to the sub SoC 44 so that the sub SoC 44 can directly communicate with the data center 10.

Figure 2:
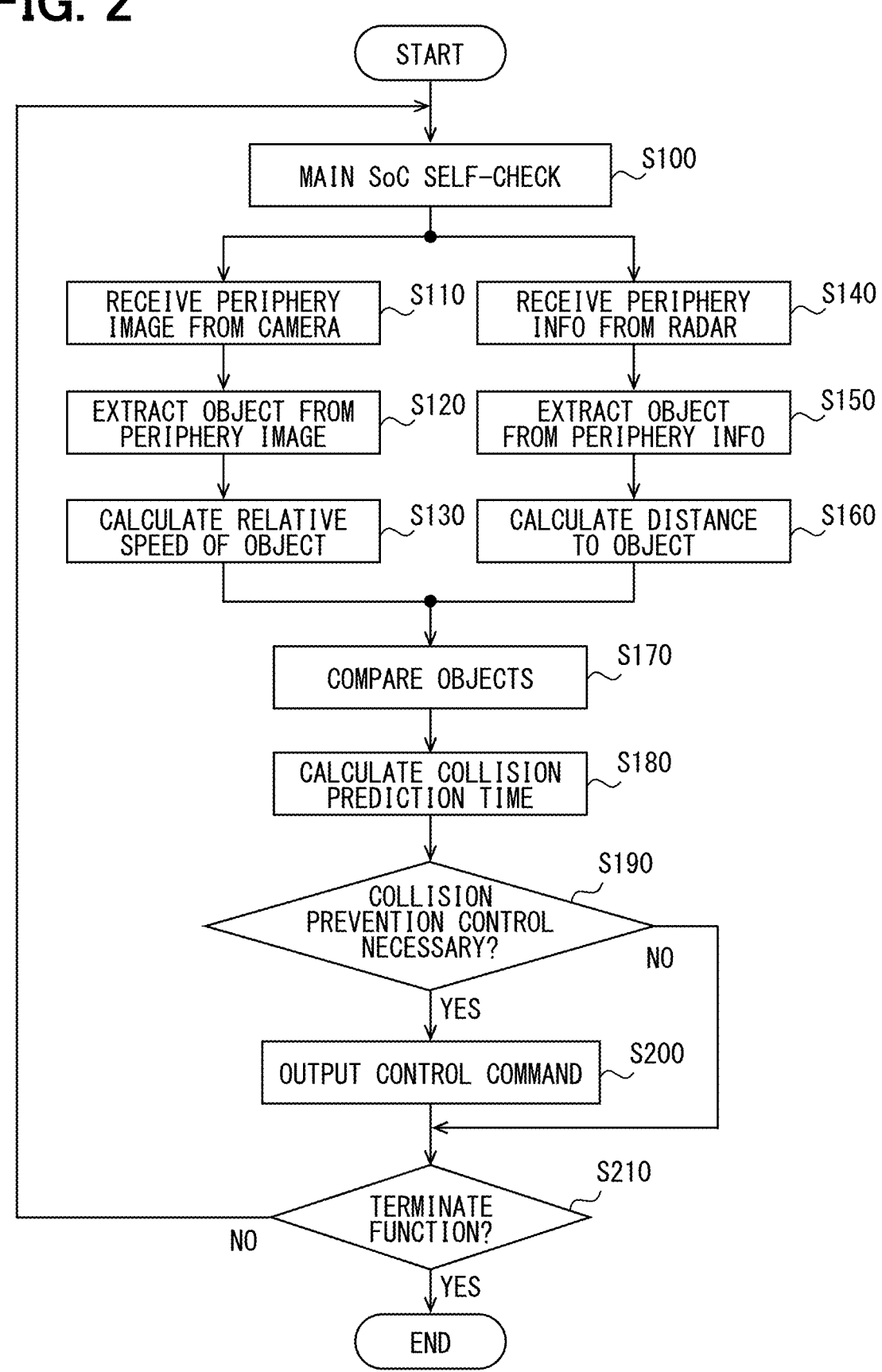
FIG. 2 is a flowchart showing a process executed by a main SoC and including a main process according to a main program.

The following will describe various processes executed by the main SoC 36 and the sub SoC 44 with reference to the flowcharts in FIG. 2 to FIG. 5, and FIG. 7 to FIG. 9. FIG. 2 is a flowchart showing a process executed by the main SoC 36, and the process executed by the main SoC includes the main processes according to the main program.

In S100, the main SoC 36 performs a self-check. In the self-check, the main SoC 36 checks whether an operation voltage supplied to the main SoC is within a predetermined voltage range, and checks whether a clock frequency serving as the basis for operation of main SoC 36 is oscillating stably, and so on. When an abnormality is detected in the self-check, there is a high possibility that the main SoC 36 will operate abnormally. Therefore, the main SoC 36 stores the result of self-check and then provides the result to the sub SoC 44, which determines whether the main SoC 36 has an abnormality.

In S110, the main SoC 36 receives the periphery image from the camera 20. In S120, the main SoC 36 performs image analysis processing on the received periphery image to extract an object that may be an obstacle to the traveling of the host vehicle. When the periphery image includes multiple objects, the main SoC 36 extracts each of the multiple objects. Then, in S130, the main SoC 36 calculates a relative speed of each object based on the change in position and size of object included in the periphery image.

In S140, the main SoC 36 receives periphery information from the radar sensor 22. In S150, the main SoC 36 extracts an object based on the received periphery information. For example, when distances between the sensor and multiple reflecting objects in the horizontal, vertical, and depth directions are within a predetermined distance range, the multiple reflecting points are integrated and extracted as a single object. In S160, the main SoC 36 calculates, for example, average distance or the minimum distance of the integrated multiple reflecting points, as the distance to the extracted object.

In S170, the main SoC 36 compares the object extracted from the periphery image of the camera 20 with the object extracted from the periphery information of the radar sensor 22 based on the position or direction of the object, and correlates identical objects with one another. In S180, the main SoC 36 calculates, for each correlated object, the collision prediction time, which is the time until the vehicle collides with the object, using the relative speed of object calculated in S130 and the distance to object calculated in S160. By using a stereo camera, the main SoC 36 can calculate the distance to each object and the relative speed of each object from the periphery image transmitted from the camera 20. The main SoC 36 may calculate the relative speed from the change in distance to the object calculated from the periphery information of radar sensor 22, and then calculate the collision prediction time using the relative speed. These processes also apply to the sub SoC 44 described below.

In S190, the main SoC 36 determines whether the collision prevention control is necessary based on the calculated collision prediction time. For example, when the calculated collision prediction time falls below a first time threshold, the main SoC 36 determines that collision prevention control is necessary. In S200, the main SoC 36 outputs a control command to an output device (not shown) to issue a warning by audio or display. When the calculated collision prediction time falls below a second time threshold that is shorter than the first time threshold, the main SoC 36 outputs a control command to the vehicle's drive device to reduce the drive force. The main SoC 36 may also output a control command to the vehicle's braking device to apply a braking force. The main SoC 36 may also output a control command to the vehicle's steering device to avoid the object existing in front of the vehicle. At least one of these controls correspond to the collision prevention control executed in S200. When multiple objects are detected, the main SoC 36 may determine execution of collision prevention control is necessary for the object having the shortest collision prediction time.

In S210, the main SoC 36 determines whether to terminate the predetermined function based on, for example, whether the main switch of vehicle is turned off and the vehicle is parked. In response to determining that the function is to be terminated, the main SoC 36 terminates the process shown in the flowchart of FIG. 2. In response to determining that the function is not to be terminated, the main SoC 36 repeats the process shown in FIG. 2 from S100.

In the above-described flowchart of FIG. 2, at least the process in S110 to S200 correspond to the main process according to the main program.

Figure 3:
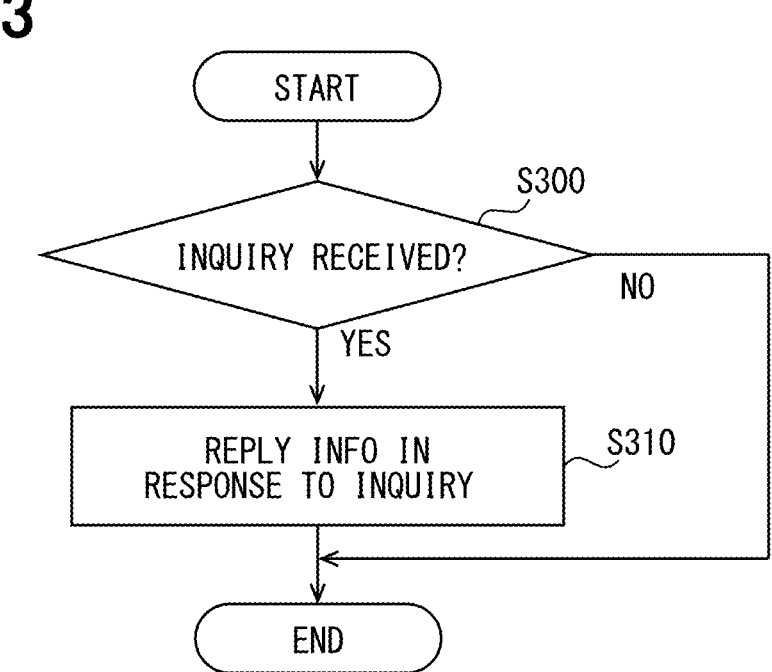
FIG. 3 is a flowchart showing a process executed by a main SoC in parallel with a process shown in the flowchart of FIG. 2.

The following will describe a flowchart of FIG. 3. FIG. 3 is a flowchart showing a process executed by the main SoC 36 in parallel with the process shown in the flowchart of FIG. 2.

As described below, the sub SoC 44 inquires the main SoC 36 for various kinds of information in order to store evaluation data for evaluating the sub program and to determine an occurrence of abnormality in the main process that is executed by the main SoC 36. The types of inquiry from the sub SoC 44 will be explained in detail later. In S300, the main SoC 36 determines whether an inquiry is received from the sub SoC 44. In response to determining that an inquiry is received, in S310, the main SoC 36 returns information corresponding to the inquiry to the sub SoC 44.

Figure 4:
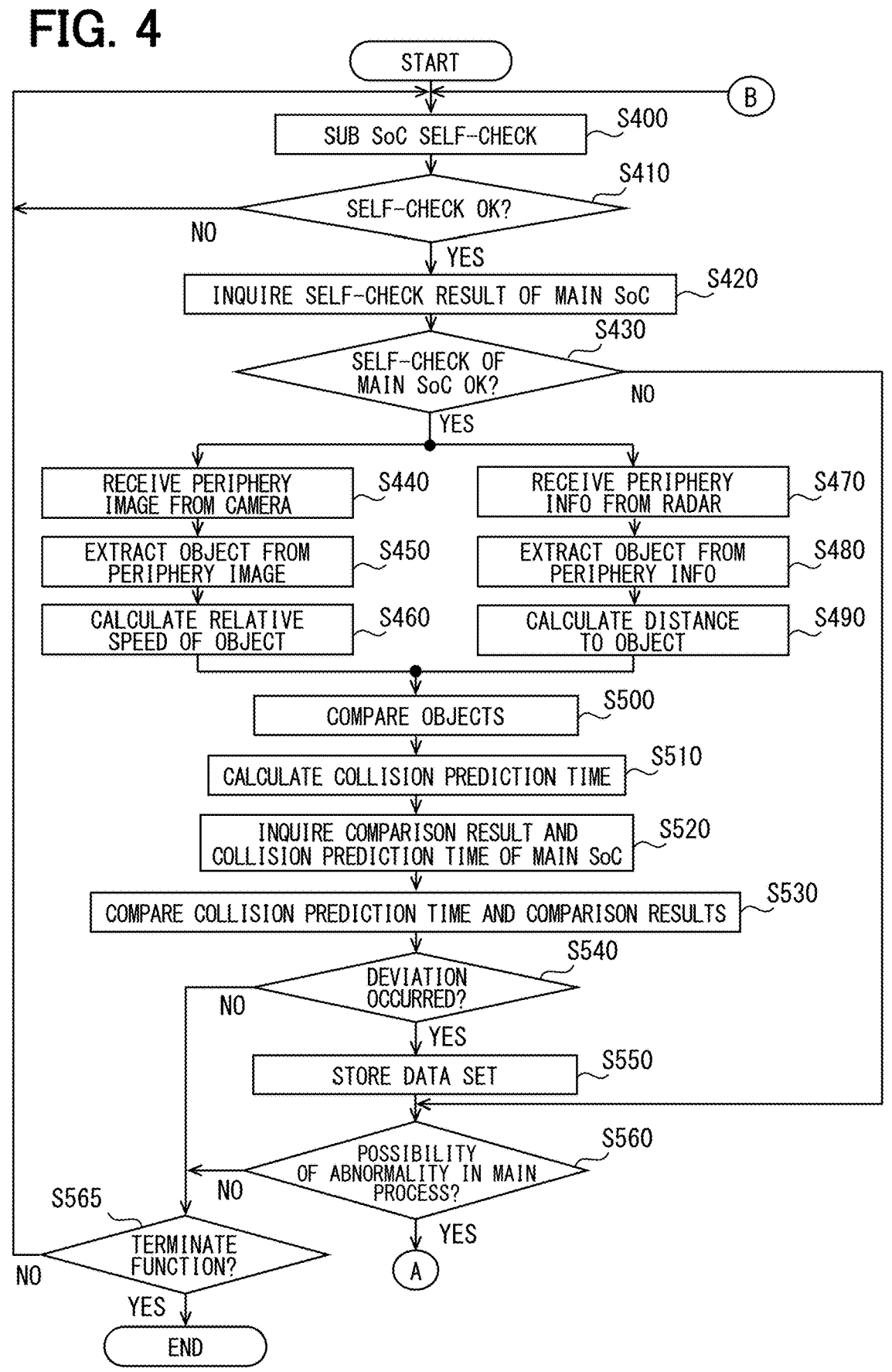
FIG. 4 is a flowchart showing a process executed by a sub SoC including a sub process according to a sub program.
Figure 5:
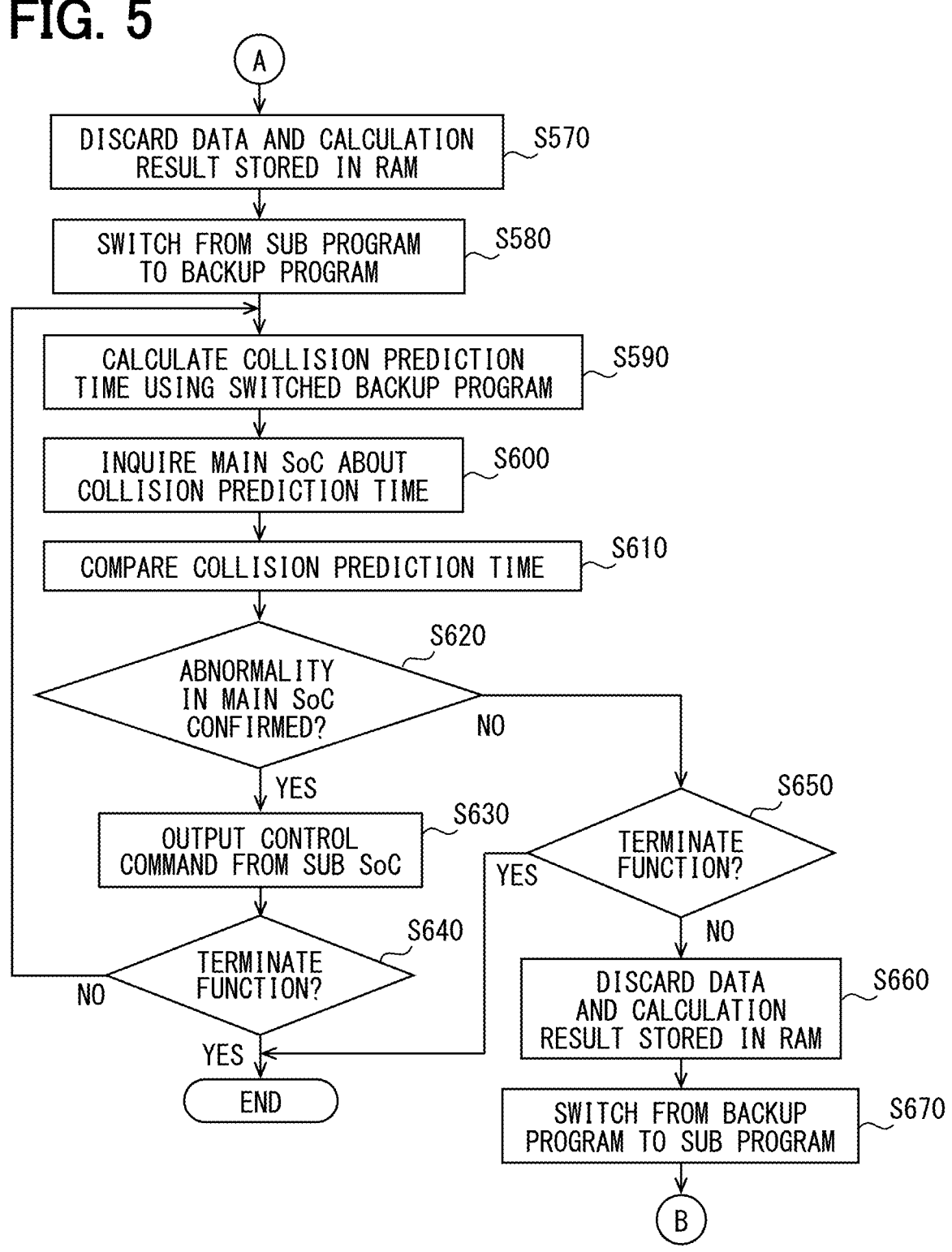
FIG. 5 is a flowchart showing a process executed by the sub SoC following the flowchart of FIG. 4.

The following will describe flowcharts of FIG. 4 and FIG. 5. FIG. 4 and FIG. 5 are flowcharts showing a process executed by the sub SoC 44, and the process includes the sub process corresponding to the sub program.

In S400, the sub SoC 44 performs a self-check. The self-check performed in S400 corresponding to an abnormality detection unit. The self-check performed by the sub SoC is similar to the self-check performed by the main SoC 36. In S410, the sub SoC 44 determines whether the self-check result in S400 is proper and whether the sub SoC 44 can function normally. When the self-check result is proper, the sub SoC 44 proceeds to S420. When the self-check result is not proper, the sub SoC 44 returns to S400.

In S420, the sub SoC 44 inquires of the main SoC 36 about the self-check result of main SoC. The sub SoC 44 then receives the self-check result as a reply to the inquiry. The received self-check result is temporarily stored in the RAM 50. In S430, the sub SoC 44 determines whether the self-check result of main SoC 36 is proper. When the self-check result of main SoC 36 is proper, the sub SoC 44 proceeds to S440 and S470. When the self-check result of main SoC 36 is not proper, the sub SoC 44 proceeds to S560.

In the process of S440 to S460, the sub SoC 44 extracts an object from the periphery image captured by the camera 20 and calculates the relative speed of extracted object. This process is basically the same as the process executed in S110 to S130 by the main SoC 36 described above. In the process of S470 to S490, the sub SoC 44 extracts an object from the periphery information received from the radar sensor 22 and calculates the distance to the object. This process is basically the same as the process executed in S140 to S160 by the main SoC 36 described above. The sub program can execute a function equivalent to that of main program, or execute a program differs in part or in whole from the main program in order to improve the performance. The sub program does not necessarily perform all the same calculations as the main program.

In S500, the sub SoC 44 compares the object extracted from the periphery image of the camera 20 with the object extracted from the periphery information of the radar sensor 22, and correlates identical objects with one another. In S510, the sub SoC 44 calculates, for each correlated object, the collision prediction time, which is the time until the vehicle collides with the object, using the relative speed of object calculated in S460 and the distance to object calculated in S490. The comparison result and the collision prediction time calculated by the sub SoC 44 are temporarily stored in the RAM 50.

In S520, the sub SoC 44 inquires the main SoC 36 about the object comparison result and collision prediction time as the calculation result of main SoC 36 (performance related indicators). The sub SoC 44 then receives the comparison result and the collision prediction time in response to the inquiry. The received comparison result and collision prediction time are temporarily stored in the RAM 50. In S530, the sub SoC 44 compares the comparison result and collision prediction time received from the main SoC 36 with the comparison result and collision prediction time calculated by the sub SoC 44, respectively. Then, the sub SoC 44 determines whether there is a deviation between the two comparison results, and determines whether there is a deviation between the two collision prediction times.

For example, when (i) there is no difference in the number of objects between the two comparison results, (ii) there is no difference in the positions of objects between the two comparison results or a distance between the positions of two comparison results is equal to or smaller than a predetermined distance threshold, and (iii) there is no difference between the collision prediction time calculated by the main SoC and the collision prediction time calculated by the sub SoC or a difference between the collision prediction time calculated by the main SoC and the collision prediction time calculated by the sub SoC is equal to or shorter than a predetermined third time threshold, the sub SoC 44 can determine that there is no deviation between the two comparison results and the two collision prediction times. In this case, the determination in S540 is "NO", and the sub SoC 44 proceeds to S565.

When the number of objects in two comparison results differs, or the positions of objects in two comparison results differ by more than the predetermined distance threshold, or the collision prediction time for the object closest to the vehicle differs by more than the predetermined third time threshold, the sub SoC may determine that a deviation has occurred between the two comparison results or determine that a deviation has occurred between the two collision prediction times. In this case, the determination in S540 is "YES", and the sub SoC 44 proceeds to S550.

In S550, since the calculation results (performance related indicators) of both the main SoC 36 and the sub SoC 44 satisfy a predetermined deviation condition, the sub SoC 44 stores, in the data storage memory 46, a data set that includes at least one of the (i) input data or (ii) both calculation results. The data set indicates the situation in which the calculation results having a deviation is acquired. The input data and both calculation results are temporarily stored in the RAM 50. The sub SoC 44 reads the corresponding data from the RAM 50 and stores the data in the data storage memory 46. This allows a program evaluator to understand the situation when a deviation occurs based on the stored data set. Therefore, the program evaluator (an engineer at the data center) can confirm whether the performance improvement of sub program reaches a required level. the program evaluator can also confirm whether the performance of sub program is inferior to the performance of main program, and can conform under what circumstance the performance of sub program is inferior to the performance of main program. The data set stored in the data storage memory 46 may include a magnitude of deviation between the performance related indicator of the main SoC 36 and the performance related indicator of the sub SoC 44. With this configuration, it is easier to grasp the degree of deviation.

The data set may include at least one of the input data or the two calculation results over a predetermined period set before and after the acquiring time of calculation result in which the deviation is occurred. With this configuration, it is possible to more accurately understand, from the data set, how and why a deviation in the calculation results is occurred. In this case, at least one of the input data or the two calculation results is repeatedly stored in the RAM 50. In response to determining that a deviation is occurred in the two calculation results, input data and/or the two calculation results may be read out from the RAM 50 for a predetermined period set before and after the deviation occurrence, and then the read out data may be stored in the data storage memory 46.

As described above, the data set includes at least one of the (i) input data or (ii) two calculation results. The data set may further include at least one of (i) the version of main program, (ii) the version of sub program, (iii) traffic environment data relating to the traffic environment around the vehicle (e.g., congested, no congestion, etc.), (iv) driving condition data relating to the driving condition of the vehicle (speed, making a turn, going straight, etc.), (v) weather data relating to the weather (sunny, rainy, snowy, foggy, etc.), or (vi) time data relating to the time. From these additional data, the program evaluator can more accurately acquire the versions of the main program and sub program used when the calculation results having the deviation are acquired, and the situation of vehicle when the calculation results having the deviation can be acquired. Since the data set includes the above-described additional data, for example, when evaluation data in a particular situation is required, it is possible to easily distinguish between necessary data and unnecessary data thereby collecting the necessary data.

The sub SoC 44 may limit the number of data sets to be stored to a predetermined number with consideration of the storage capacity of data storage memory 46. In this case, the sub SoC 44 may select the data sets to be stored in descending order of the deviation degree between the calculation result of main SoC 36 and the calculation result of sub SoC 44, and then store the selected data sets. This is because an importance degree of the sub program as evaluation data is increased with increase of deviation degree in the two calculation results. After the number of data sets to be stored reaches the preset limit, when a calculation result having a greater deviation than that of the stored data set is acquired, the stored data set may be overwritten with the newly acquired data set.

When storing the data sets in the data storage memory 46, the sub SoC 44 may distinguish (i) the data set indicating that the calculation result of sub process corresponding to the sub program has a higher performance for the predetermined function compared with the calculation result of main process corresponding to the main program, from (ii) the data set indicating that the calculation result of sub process corresponding to the sub program has a lower performance for the predetermined function compared with the calculation result of main process corresponding to the main program. In this configuration, based on the stored data sets, it is possible to evaluate the performance of sub program in terms of both performance improvement and performance degradation relative to the main program. In this case, when limiting the number of data sets to be stored to the predetermined number, separate limits may be set for the data sets, each of which indicates that the calculation result of sub process corresponding to the sub program has the higher performance for the predetermined function compared with the calculation result of main process corresponding to the main program, and the data sets, each of which indicates that the calculation result of sub process corresponding to the sub program has the lower performance for the predetermined function compared with the calculation result of main process corresponding to the main program.

In S560 of the flowchart shown in FIG. 4, the sub SoC 44 determines whether there is a possibility of abnormality in the main process executed by the main SoC 36 based on the self-check result of the main SoC 36 in S430, the comparison results of the main SoC 36 and the sub SoC 44 in S530, and the collision prediction times of the main SoC 36 and the sub SoC 44 in S530. For example, in response to determining, in S430, that the self-check result of the main SoC 36 is not proper, the sub SoC 44 can determine that there is a possibility of abnormality occurrence in the main process executed by the main SoC 36.

The sub SoC 44 compares the comparison result of the main SoC 36 with the comparison result of the sub SoC 44, and compares the collision prediction time of the main SoC 36 with the collision prediction time of sub SoC 44. As the comparison result, when the sub SoC 44 detects an object while the main SoC 36 does not detect an object, the sub SoC can determine that there is a possibility of abnormality occurrence in the main process executed by the main SoC 36. For example, when the main SoC 36 does not detect an object for which the collision prediction time is to be calculated while the collision prediction time calculated by the sub SoC 44 reaches a fourth time threshold, the sub SoC 44 can determine that there is a possibility of abnormality occurrence in the main process executed by the main SoC 36. For example, when the collision prediction time calculated by the main SoC 36 is delayed by more than a third time threshold compared to the collision prediction time calculated by the sub SoC 44, the sub SoC 44 can determine that there is a possibility of abnormality occurrence in the main process executed by the main SoC 36.

The above-described abnormality determination in the main process executed by the main SoC 36 will be described from another perspective with reference to a table shown in FIG. 6. In the table shown in FIG. 6, a circle is marked when an object is extracted from the periphery image captured by the camera 20, and when an object is extracted from the periphery information generated by the radar sensor 22, and a cross is marked when no object is extracted. For example, in case 1, in the main process and the sub process, objects are extracted from the periphery image captured by the camera 20 and the periphery information generated by the radar sensor 22, respectively. In this case, when there is no significant difference in the numbers, positions, and collision prediction times of objects, the sub SoC 44 executes the shadow mode. When there is a significant difference in the numbers, positions, and collision prediction times of objects, the sub SoC 44 executes the backup mode. Herein, the significant difference refers to a difference based on which abnormality occurrence in the main SoC 36 can be determined.

In case 2 to case 4, case 8, and case 12, there is a deficiency in the object detection by the camera 20 and/or radar sensor 22 in the sub process, and the object detection is properly performed by the camera 20 and/or radar sensor 22 in the main process compared to the sub process. In this case, the main process executed by the main SoC 36 can be considered to be performed normally, so the sub SoC 44 executes the shadow mode.

In case 5, case 9, case 13, case 14, and case 15, the object detection by the camera 20 and/or radar sensor 22 in the sub process is normal, and there is a deficiency in the object detection by the camera 20 and/or radar sensor 22 in the main process compared to the sub process. In this case, since there is a possibility of abnormality occurrence in the main process executed by the main SoC 36, the sub SoC 44 executes the backup mode.

In case 6, case 7, case 10, and case 11, there is a deficiency in the object detection by the camera 20 or the radar sensor 22 in both of the sub process and the main process. Therefore, in these cases, as described above, the sub SoC determines whether there is a possibility of abnormality occurrence in the main process executed by the main SoC 36 based on the number of objects, object positions, and the collision prediction times, and determines to execute either the shadow mode or the back mode depending on the determination result.

In case 16, it is not possible to determine whether there is a possibility of abnormality occurrence in the main process executed by the main SoC 36. Therefore, the sub SoC 44 executes the shadow mode.

In the present embodiment, when the calculation result (performance related indicator) of the main process is inferior to the calculation result (performance related indicator) of the sub process in terms of executing the predetermined function by exceeding the abnormality determination criterion described above, the sub SoC 44 determines that there is a possibility of abnormality occurrence in the main process (or there is a possibility of abnormality in the main SoC 36). Therefore, according to above-described vehicle electronic control device and method of the present embodiment, it is possible to detect an abnormality in the main process, which corresponds to the main program and actually performs the control, by utilizing the sub program.

When the sub SoC 44 determines, in S560, that there is a possibility of abnormality occurrence in the main process executed by the main SoC 36, the sub SoC 44 proceeds to S570 as shown in the flowchart of FIG. 5. When the sub SoC 44 determines, in S560, that there is no possibility of abnormality occurrence in the main process executed by the main SoC 36, the sub SoC 44 proceeds to S565. In S565, the sub SoC 44 determines whether to terminate the predetermined function, that is, the collision prevention control function. In response to determining that the function is to be terminated, the sub SoC 44 terminates the process shown in the flowchart of FIG. 4. In response to determining that the function is not to be terminated, the sub SoC 44 returns to S400.

In S570, data and calculation results stored in the RAM 50 during execution of the sub process corresponding to the sub program are discarded. In S580, the sub SoC 44 switches the program to be executed from the sub program (or the abnormality determination process of the main program) to the backup program. In the above-described flowchart of FIG. 4, at least the process executed in S440 to S510 corresponds to sub process according to the sub program. The process executed in S530 to S550 corresponds to a storing process for storing the data set to be used for evaluating the performance of sub program. The process executed in S560 and S570 corresponds to the abnormality determination process of the main program. The process executed in S560 and S570 also corresponds to an abnormality determination unit. The storing process and the abnormality determination process may be configured as part of the sub program.

In S590, the sub SoC 44 calculates the collision prediction time until collision with the object using the backup program executed after switching. At this time, by executing the switched backup program, the SoC 44 calculates the collision prediction time until collision with the object after execution of the above-described calculation process in S110 to S170.

In S600, the sub SoC 44 inquires of the main SoC 36 about the collision prediction time. The sub SoC 44 receives the collision prediction time as a response to the inquiry. In S610, the sub SoC 44 compares the collision prediction time received from the main SoC 36 with the collision prediction time calculated by the sub SoC 44 to determine an abnormality occurrence in the main SoC 36. In S600, the sub SoC 44 may inquire of the main SoC 36, in addition to the collision prediction time, the comparison result. In this case, the sub Soc determines, in S610, whether there is an abnormality occurrence in the main SoC 36 based on the comparison result of two comparison results, in addition to the comparison result of two collision prediction times.

As a result of the comparison in S610, when the main SoC 36 detects no object for which the collision prediction time is to be calculated while the collision prediction time calculated by the sub SoC 44 reaches the fourth time threshold, or when the collision prediction time calculated by the main SoC 36 is delayed from the collision prediction time calculated by the sub SoC 44 by more than the third time threshold, the sub SoC 44 determines that an abnormality is occurred in the main process executed by the main SoC 36. When the self-check result of main SoC 36 is not proper, the sub SoC 44 may also determine that an abnormality is occurred in the main process of main SoC 36. As described above, when the abnormality occurrence in the main SoC 36 is determined, the sub SoC 44 confirms, in S620, the abnormality occurrence in the main SoC 36, and then proceeds to S630. When the sub SoC 44 determines, in S610, that no abnormality is occurred in the main process executed by the main SoC 36 and the self-check result of main SoC 36 is proper, the sub SoC 44 proceeds to S650.

In S630, the sub SoC 44 continues execution of the switched backup program, and outputs the control command as necessary. In S640, the sub SoC 44 determines whether to terminate the predetermined function, that is, the collision prevention control function. In response to determining that the function is to be terminated, the sub SoC 44 terminates the process shown in the flowcharts of FIG. 4 and FIG. 5. In response to determining that the function is not to be terminated, the sub SoC 44 returns to S590. In this case, once the sub SoC 44 has determined that an abnormality in the main SoC 36 is confirmed, the sub SoC 44 may output a control command in S630 regardless of the results of S600 to S620. Alternatively, once the sub SoC 44 has determined that an abnormality is occurred in the main SoC 36, S600 to S620 may be skipped.

When the sub SoC 44 determines, in S620, that the main SoC 36 is operating normally, the sub SoC 44 determines whether to terminate the predetermined function in S650. In response to determining that the function is to be terminated, the sub SoC 44 terminates the process shown in the flowcharts of FIG. 4 and FIG. 5. In response to determining that the function is not to be terminated, the sub SoC 44 proceeds to S660. In S660, after switching to the backup program, the data and calculation results stored in the RAM 50 are discarded. In S670, the sub SoC 44 switches the program to be executed from the backup program to the sub program. Thereafter, the sub SoC 44 returns to S400 of the flowchart of FIG. 4.

The following will describe a flowchart shown in FIG. 7. FIG. 7 is a flowchart showing a process executed by the data center 10.

In S700, the data center 10 prepares a different version of sub program with improved performance based on collected evaluation data, and distributes the prepared sub program to the target vehicle. The target vehicle is a vehicle prepared to use the sub program distributed from the data center. The data center 10 may assign a vehicle ID to each vehicle, and manage the types of programs to be used in each vehicle using a database.

In S710, the data center 10 inquires of the target vehicle, which includes the sub SoC 44 in which the sub program to be evaluated is implemented, about evaluation data (the above-described data set) of the sub program. In response to the evaluation data inquiry, each target vehicle replies, to the data center, brief of the evaluation data stored in the corresponding vehicle. The brief of evaluation data may include the comparison results of performance related indicators, the degree of deviation (i.e., the magnitude of deviation), the versions of main program and sub program, and/or additional data indicating the situation when the deviation is occurred, as described below. Each target vehicle transmits brief of the evaluation data instead of immediately transmitting input data such as camera images. Thus, it is possible to suppress an increase in communication load while enabling the data center 10 to perform screening of the collected data. Details will be described below. The brief of evaluation data is included in the evaluation data.

In S720, the data center 10 determines whether the evaluation data is necessary based on the brief of evaluation data transmitted from each target vehicle. For example, when sufficient evaluation data has already been collected under similar circumstances, the data center 10 determines that the corresponding evaluation data is "unnecessary." Conversely, when sufficient evaluation data has not been collected under similar circumstances, the data center 10 determines that the corresponding evaluation data is "necessary." The data center 10 may determine whether the evaluation data is required based on the degree of deviation between the performance related indicators. For example, the data center 10 may determine that evaluation data having a deviation of predetermined degree or higher is "necessary," and may determine that evaluation data having a deviation of lower than the predetermined degree is "unnecessary." Alternatively, the data center 10 may determine that evaluation data having a deviation of equal to or higher than a lowest deviation degree among the history evaluation data already collected is "necessary," and may determine that evaluation data having a deviation of lower than the lowest deviation degree among the history evaluation data already collected is "unnecessary." In response to determining that the evaluation data is "necessary", the data center 10 proceeds to S730. In response to determining that the evaluation data is "unnecessary", the data center 10 proceeds to S750.

In S730, the data center 10 instructs the target vehicle for which evaluation data is determined to be "necessary" to transmit all of the evaluation data including input data, such as camera images. Then, in S740, the data center 10 receives all of the evaluation data transmitted from each target vehicle, and all of the received evaluation data is stored in the database. In S750, for a target vehicle for which the evaluation data is determined to be "unnecessary", the data center 10 instructs discarding of the evaluation data.

In S760, the data center 10 determines whether a required amount of evaluation data is collected or determines whether evaluation data is collected from all of the target vehicles. In response to determining that the required amount of evaluation data is collected or the evaluation data is collected from all of the target vehicles, the data center 10 terminates the process shown in the flowchart of FIG. 7. In response to determining that the required amount of evaluation data has not yet been collected or the evaluation data has not yet been collected from all of the target vehicles, the data center 10 returns to S710.

The following will describe a flowchart shown in FIG. 8. FIG. 8 is a flowchart illustrating another process executed by the data center 10.

When the performance of sub program is verified based on sufficient evaluation data, the sub program is distributed to each target vehicle as an update main program for updating the existing main program in each target vehicle. In S800 of FIG. 8, the data center 10 distributes the update main program to each target vehicle. In S810, the version of distributed main program is written in the database, and the update information is stored in the database.

Figure 9:
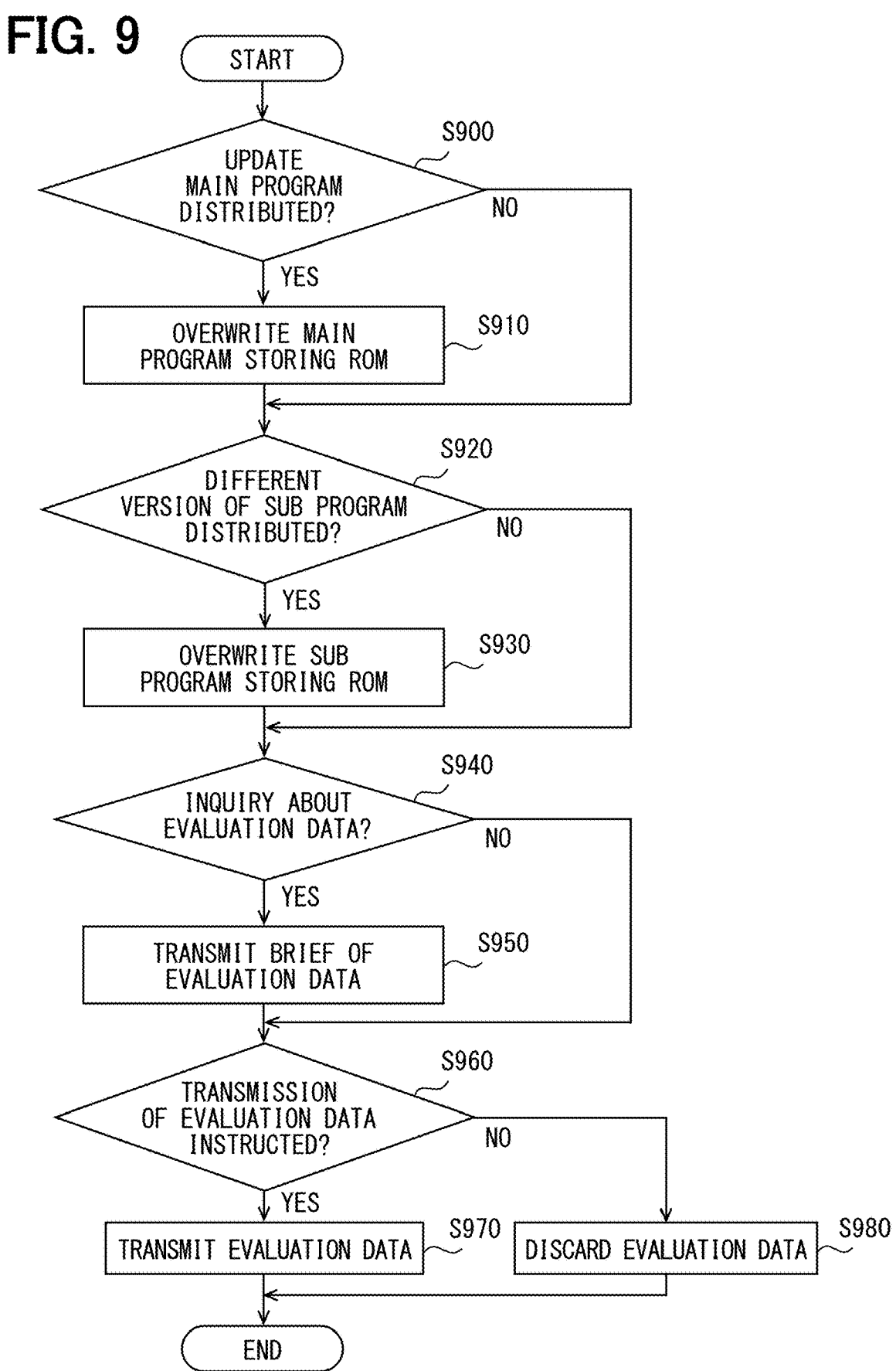
FIG. 9 is a flowchart showing a process executed by the vehicle electronic control device of a target vehicle for performing communication with the data center or for updating the main program and the sub program.

The following will describe a flowchart shown in FIG. 9. FIG. 9 is a flowchart showing a process executed by the vehicle electronic control device 30 of a target vehicle for performing communication with the data center 10 or for updating the main program and the sub program.

In S900, the vehicle electronic control device 30 determines whether an update main program is distributed from the data center 10. When the update main program is distributed, the vehicle electronic control device 30 receives the update main program in S910. Then, the vehicle electronic control device 30 overwrites the existing main program stored in the main program storing ROM 40 with the received update main program. Thus, the vehicle electronic control device 30 can rewrite the main program stored in the ROM 40.

In S920, the vehicle electronic control device 30 determines whether a different version of sub program having improved performance is distributed from the data center 10 based on the collected evaluation data or the like. When a different version of sub program having improved performance is distributed, the vehicle electronic control device 30 receives the different version of sub program in S930. Then, the vehicle electronic control device 30 overwrites the received different version of sub program over the existing sub program stored in the ROM 48. The ROM 48 is also referred to as a sub program storing ROM 48. Thus, the vehicle electronic control device 30 can rewrite the sub program storing ROM 48.

In S940, the vehicle electronic control device 30 determines whether an inquiry about the evaluation data of sub program is received from the data center 10. In response to determining that an inquiry about evaluation data is received, the vehicle electronic control device 30 transmits a brief of stored evaluation data (the data stored in the data storage memory 46) in S950. When the evaluation data is not stored, the vehicle electronic control device 30 returns a message indicating no data stored in the memory, to the data center 10.

In S960, the vehicle electronic control device 30 determines whether (i) an instruction to transmit the evaluation data of sub program or (ii) an instruction to discard the evaluation data is received from the data center 10. When the transmission instruction is received, the vehicle electronic control device 30 transmits the stored evaluation data to the data center 10 in S970. When the instruction to discard the evaluation data is received, the vehicle electronic control device 30 discards the stored evaluation data in S980.

As described above, according to the vehicle electronic control device 30 of the present embodiment, when a deviation occurs between (i) the calculation result of sub program, which is a different version of program from the current version and is designed to improve performance with respect to the predetermined function, and (ii) the calculation result of main program, which is the current version of program and executes the predetermined, the data set indicating the situation when the deviation is occurred is stored in the storage medium. The stored data set includes at least one of the (i) input data or (ii) the calculation results of the sub program and the main program. That is, the stored data set may include only the input data. The stored data set may include only the calculation results of the sub program and the main program. The stored data set may include both of the (i) input data and the (ii) calculation results of the sub program and the main program. Therefore, according to the vehicle electronic control device 30 of the present embodiment, it is possible to efficiently store data sets that are important for evaluating sub program in the storage medium, and to efficiently collect data by the data center 10.

Second Embodiment

The following will describe a vehicle electronic control device 30 according to a second embodiment of the present disclosure. The vehicle electronic control device 30 according to the present embodiment may be configured similarly to the vehicle electronic control device 30 according to the first embodiment. Therefore, a description of the same configuration will be omitted.

The vehicle electronic control device 30 according to the first embodiment described above stores, in the storage medium, the data set indicating the situation when the deviation occurs between the calculation result of main process corresponding to the main program and the calculation result of sub process corresponding to the sub program.

In the vehicle electronic control device 30 of the present embodiment, when a deviation occurs between the calculation result of main process corresponding to the main program and the calculation result of sub process corresponding to the sub program, rather than simply storing the data set, which indicates the situation when the calculation results having the deviation is acquired, the vehicle electronic control device 30 inquires of the data center 10 whether the data set needs to be stored. Then, when a response indicating storing of data set is necessary is received from the data center 10, the corresponding data set is stored in the storage medium. With this configuration, it is possible to avoid storing unnecessary data sets and to efficiently use the storage capacity of storage medium.

Figure 10:
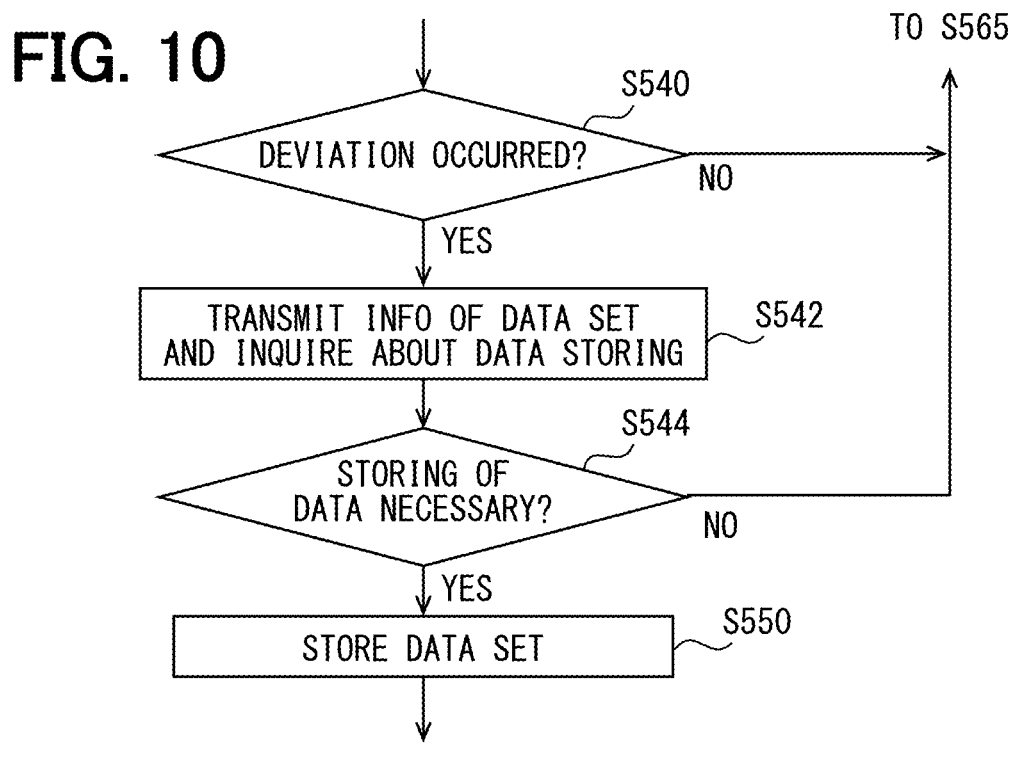
FIG. 10 is a flowchart showing a part of a process executed by a vehicle electronic control device according to a second embodiment.

FIG. 10 is a flowchart showing the storing process executed by the vehicle electronic control device 30 (sub SoC 44) according to the present embodiment. The flowchart shown in FIG. 10 includes steps S542 and S544 in addition to the flowchart in FIG. 4. In the flowchart shown in FIG. 10, except S542 and S544, the remaining process is similar to that shown in the flowchart of FIG. 4.

When the process determines in S540 that there is a deviation between the two calculation results, the sub SoC 44 proceeds to S542. In S542, the sub SoC 44 transmits information about the data set (for example, information equivalent to the brief of evaluation data described above) to the data center 10, and inquires of the data center 10 about whether the data set needs to be stored. In S544, when the sub SoC 44 determines, based on the response from the data center 10, that it is necessary to store the data set, the sub SoC 44 proceeds to S550. In S550, the sub SoC 44 stores the data set in the storage medium. When the data center 10 responds that the data set does not need to be stored, the sub SoC 44 proceeds to S565 without storing the data set.

In the above example, the vehicle electronic control device 30 inquires of the data center 10 whether to store the data set. Alternatively, the vehicle electronic control device 30 may acquire selection information in advance from the data center 10 for selecting the data set to be stored, and store only the data set that matches the selection information in the storage medium.

Figure 11:
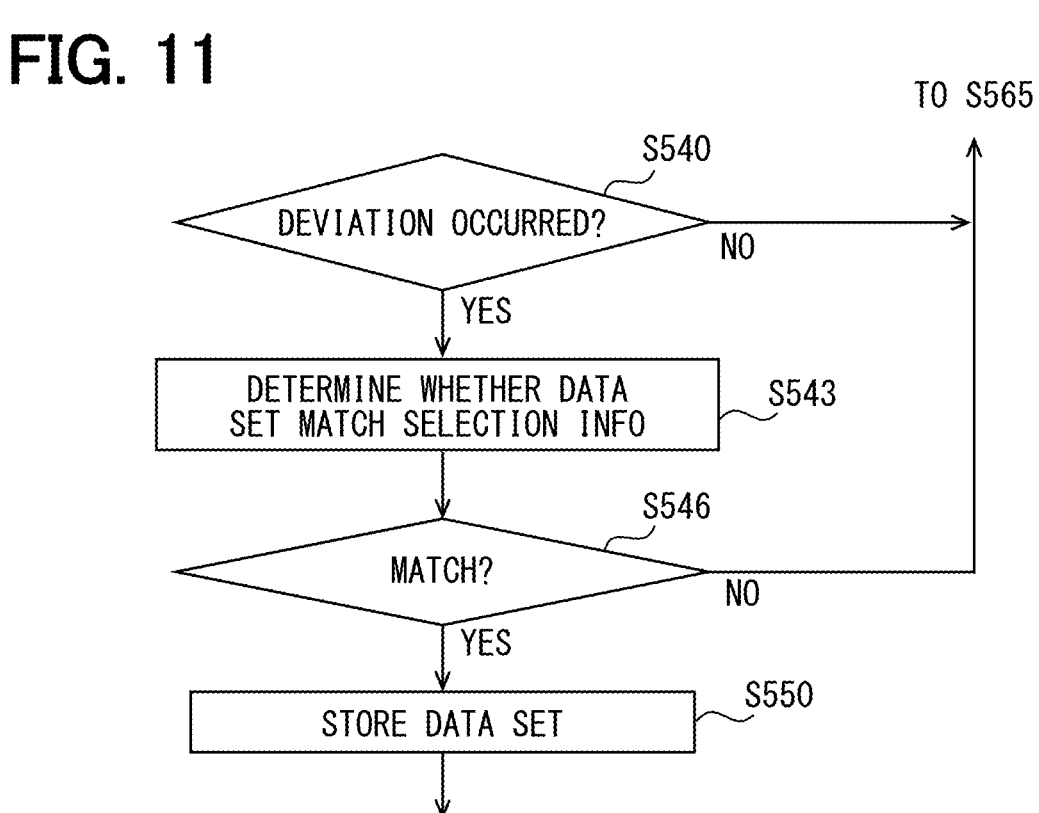
FIG. 11 is a flowchart showing a part of a process executed by a vehicle electronic control device according to a modified example of the second embodiment.

FIG. 11 is a flowchart including a storing process for storing only data set that matches the selection information. The flowchart shown in FIG. 11 includes steps S543 and S546, in addition to the flowchart in FIG. 4. In the flowchart shown in FIG. 11, except S543 and S546, the remaining process is similar to that shown in the flowchart of FIG. 4.

When the process determines, in S540, that there is a deviation between the two calculation results, the sub SoC 44 proceeds to S543. In S543, the sub SoC 44 determines whether the data set matches the selection information, which is acquired in advance. When the set data matches the selection information, the determination in S546 is "YES". Then, in S550, the sub SoC 44 stores the data set in the storage medium. When the data set does not match the selection information, the determination result in S546 is "NO". Then, the sub SoC 44 proceeds to S565 without storing the data set.

Although embodiments of the present disclosure have been described above, the present disclosure is not limited to the above-described embodiments, and various modifications can be made without departing from the spirit of the present disclosure.

For example, in each of the above-described embodiments, the vehicle electronic control device 30 executes the collision prevention control function as the predetermined function. Alternatively, the predetermined function executed by the vehicle electronic control device 30 is not limited to the collision prevention control function. For example, the vehicle electronic control device 30 may execute, as the predetermined functions, a rear cross traffic alert function, an adaptive cruise control function, a traffic sign recognition function, a lane departure prevention function, or a blind spot monitoring function. The rear cross traffic alert function detects a moving object approaching from a blind spot when the vehicle is traveling in rear direction and issues a warning or automatically applies the brakes to the vehicle. The adaptive cruise control function detects a vehicle existing in front of own vehicle and follows the front vehicle while maintaining a safe inter-vehicle distance. The traffic sign recognition function recognizes various traffic signs on the road and informs the driver of these signs. The lane departure prevention function detects marking lines on the road and assists traveling within the traveling lane. The blind spot monitoring function detects vehicles approaching from the lateral side or rear side and notifies the driver of the approaching vehicles.

When detecting objects such as other vehicles using the rear cross traffic alert function, the blind spot monitoring function, the adaptive cruise control function, etc., the deviation between calculation results may be determined based on the detectable distance. Regarding the traffic sign recognition function, the deviation between calculation results may be determined based on the recognizable distance and recognition rate of the traffic sign. Regarding the lane departure prevention function, the deviation between the calculation results may be determined based on the recognition rate of the marking line and the vehicle position within the traveling lane (the closer to the center, the higher the performance).

In each of the above-described embodiments, input data such as the periphery image captured by the camera 20 and the periphery information generated by the radar sensor 22 are input in parallel from the deserializers 32, 34 to the main SoC 36 and the sub SoC 44. Alternatively, the input data may be inputted once to the main SoC 36, and then transmitted from the main SoC 36 to the sub SoC 44 via the communication interface.

Further, the electronic control device and the method executed by the electronic control device described in the present disclosure may be implemented by a dedicated computer which includes a processor programmed to perform one or more functions executed by a computer program. Alternatively, the electronic device and the method executed by the electronic control device according to the present disclosure may be implemented by one or more dedicated computers implemented by a combination of a processor that executes a computer program and one or more hardware logic circuits.

What is claimed is:

1. A vehicle electronic control device mounted on a vehicle and executing a predetermined function of the vehicle, the vehicle electronic control device comprising:
    a main processor executing a main process according to a main program based on input data from at least one sensor;
    a sub processor executing a sub process according to a sub program based on input data same as the input data of the main processor; and an abnormality determination unit comparing (i) a calculation result of the main process calculated by the main processor with (ii) a calculation result of the sub process calculated by the sub processor and determining an abnormality in the main processor based on a comparison result of the calculation results,
wherein
the predetermined function is performed by the main process, which is executed by the main processor according to the main program,
the sub program is capable of executing the predetermined function equivalent to the predetermined function of the main program,
the sub program provides an improved performance than the main program by having a configuration that differs in part or in whole from a configuration of the main program,
the sub processor has a verified program for executing a substitute process to the main process, and
the sub processor switches an execution target program from the sub program to the verified program and executes the substitute process in response to the abnormality determination unit determining the abnormality in the main processor.

2. The vehicle electronic control device according to claim 1, wherein
each of (i) the calculation result of the main process and (ii) the calculation result of the sub process is a performance related indicator, which indicates a performance of the predetermined function, and
the abnormality determination unit determines the abnormality in the main processor when the performance related indicator calculated by the main process is inferior to the performance related indicator calculated by the sub process by exceeding an abnormality determination criterion in terms of executing the predetermined function.

3. The vehicle electronic control device according to claim 1, wherein,
after switching to the verified program for executing the substitute process, the sub processor compares a calculation result of the substitute process with the calculation result of the main process executed by the main processor, and determines the abnormality in the main processor based on a comparison result of the calculation result of the substitute process and the calculation result of the main process.

4. The vehicle electronic control device according to claim 1, wherein
the sub processor performs the predetermined function by the substitute process according to the switched verified program, instead of the main process executed by the main processor.

5. The vehicle electronic control device according to claim 1, further comprising
an abnormality detection unit detecting an abnormality in the sub processor,
wherein, when the abnormality detection unit detects the abnormality in the sub processor, the sub processor does not switch the execution target program from the sub program to the verified program.

6. The vehicle electronic control device according to claim 1, wherein
the sub processor includes a data storage medium temporarily storing data during execution of the sub process according to the sub program, and the sub processor discards the data stored in the data storage medium in response to switching the execution target program from the sub program to the verified program for executing the substitute process.

7. A method of determining an abnormality in a main process executed according to a main program, the method being executed by at least one processor of a vehicle electronic control device mounted on a vehicle, the vehicle electronic control device executing a predetermined function of the vehicle, the method comprising:

executing, on a main processor, a main process according to a main program based on input data from at least one sensor;

executing, on a sub processor, a sub process according to a sub program based on input data same as the input data of the main process; and comparing a calculation result of the main process with a calculation result of the sub process and determining an abnormality in the main process based on a comparison result of the calculation results, wherein the predetermined function is executed by the main process according to the main program, the sub program is capable of executing the predetermined function equivalent to the predetermined function of the main program, the sub program provides an improved performance than the main program by having a configuration that differs in part or in whole from a configuration of the main program, the sub processor has a verified program for executing a substitute process to the main process, and the sub processor switches an execution target program from the sub program to the verified program and executes the substitute process in response to determining the abnormality in the main process.

8. The method according to claim 7, wherein each of (i) the calculation result of the main process and (ii) the calculation result of the sub process is a performance related indicator, which indicates a performance of the predetermined function, and the abnormality in the main process is determined when the performance related indicator calculated by the main process is inferior to the performance related indicator calculated by the sub process by exceeding an abnormality determination criterion in terms of executing the predetermined function.

9. The method according to claim 7, wherein, after switching to the verified program for executing the substitute process, the sub processor compares a calculation result of the substitute process with the calculation result of the main process executed by the main processor, and determines the abnormality in the main processor based on a comparison result of the calculation result of the substitute process and the calculation result of the main process.

10. The method according to claim 7, wherein the sub processor performs the predetermined function by the substitute process according to the switched verified program, instead of the main process executed by the main processor.

11. The method according to claim 7, further comprising detecting an abnormality in the sub processor, wherein, when the abnormality in the sub processor is detected, the sub processor does not switch the execution target program from the sub program to the verified program.

12. The method according to claim 7, wherein the sub processor includes a data storage medium temporarily storing data during execution of the sub process according to the sub program, and the sub processor discards the data stored in the data storage medium in response to switching the execution target program from the sub program to the verified program for executing the substitute process.

* * * * *